United States Patent
McGuire et al.

(10) Patent No.: US 7,506,745 B1
(45) Date of Patent: Mar. 24, 2009

(54) MOUNTING SYSTEM FOR A VERTICAL CONVEYOR BELT

(75) Inventors: Patrick M. McGuire, Trophy Club, TX (US); Donald K. Wier, Mansfield, TX (US)

(73) Assignee: Transnorm System, Inc, Arlington, TX (US)

( * ) Notice: Subject to any disclaimer, the term of this patent is extended or adjusted under 35 U.S.C. 154(b) by 0 days.

(21) Appl. No.: 12/002,601

(22) Filed: Dec. 18, 2007

(51) Int. Cl.
  *B65G 47/26* (2006.01)
(52) U.S. Cl. .............................. 198/457.03; 198/370.1; 198/597
(58) Field of Classification Search .............. 198/370.1, 198/370.08, 457.01, 457.03, 597, 861.1, 198/861.6
  See application file for complete search history.

(56) References Cited

U.S. PATENT DOCUMENTS

| | | | |
|---|---|---|---|
| 3,104,755 A * | 9/1963 | Zuercher | 198/370.08 |
| 3,166,181 A * | 1/1965 | Rutkus et al. | 198/457.01 |
| 3,366,220 A | 1/1968 | Hebel | |
| 3,900,096 A * | 8/1975 | Nack et al. | 198/457.03 |
| 4,803,804 A | 2/1989 | Bryant | |
| 5,161,665 A | 11/1992 | Cragun | |
| 5,389,045 A | 2/1995 | Lyons | |
| 5,988,356 A * | 11/1999 | Bonnet | 198/370.08 |
| 6,189,702 B1 | 2/2001 | Bonnet | |
| 6,273,243 B1 | 8/2001 | Loose et al. | |
| 6,962,250 B2 * | 11/2005 | Van Liempd et al. | 198/457.03 |
| 7,124,876 B2 * | 10/2006 | Wolf | 198/370.08 |
| 7,222,728 B2 | 5/2007 | Wier et al. | |

* cited by examiner

*Primary Examiner*—James R Bidwell
(74) *Attorney, Agent, or Firm*—Kenneth F. Pearce (57) ABSTRACT

The present invention is a mounting system for vertical conveyor belts. The combination of rider positioned on the inward side of the vertical conveyor belt and a guide positioned outward of the outer surface of the conveyor frame secures the vertical conveyor belt about the diverter assemblage.

18 Claims, 8 Drawing Sheets

Positioning a diverting assemblage above a carriage path, wherein the diverting assemblage comprises: i) a first outward face proximate the articles to be diverted; ii) a second outward face opposite the first outward face; iii) a drive pulley and iv) a follower roll Connecting a first guide to the first outward face such that a first slot is created between the first guide and the first outward face Connecting a second guide to the second outward face such that a second slot is created between the second guide and the second outward face Positioning a rider on an inward side of the vertical conveyor belt such that an upper edge of the rider is juxtapose the upper edge of the vertical conveyor belt Mounting the vertical conveyor belt about the diverting assemblage such that the rider reciprocates with the first and second slots Powering the drive pulley and diverting one or more of the articles

FIG 7

Positioning a diverting assemblage above a carriage path, wherein the diverting assemblage comprises: i) a first outward face proximate the articles to be diverted; ii) a second outward face opposite the first outward face; iii) a drive pulley and iv) a follower roll Connecting a first guide to the first outward face such that a first slot is created between the first guide and the first outward face Connecting a second guide to the second outward face such that a second slot is created between the second guide and the second outward face Creating hooks by angling at least a part of each of the guides in a vertically upward direction Positioning a rider on an inward side of the vertical conveyor belt such that an upper edge of the rider is juxtapose the upper edge of the vertical conveyor belt Mounting the vertical conveyor belt about the diverting assemblage such that the rider reciprocates with the first and second slots Powering the drive pulley and diverting one or more of the articles

FIG 8

Positioning a diverting assemblage above a carriage path, wherein the diverting assemblage comprises: i) a first outward face proximate the articles to be diverted; ii) a second outward face opposite the first outward face; iii) a drive pulley and iv) a follower roll Connecting a first guide to the first outward face such that a first slot is created between the first guide and the first outward face Connecting a second guide to the second outward face such that a second slot is created between the second guide and the second outward face Creating hooks by angling at least a part of each of the guides in a vertically upward direction Positioning a rider on an inward side of the vertical conveyor belt such that an upper edge of the rider is juxtapose the upper edge of the vertical conveyor belt Depending a catch from the rider for reciprocating with the hooks Mounting the vertical conveyor belt about the diverting assemblage such that the rider reciprocates with the first and second slots Powering the drive pulley and diverting one or more of the articles

MOUNTING SYSTEM FOR A VERTICAL CONVEYOR BELT

BACKGROUND OF THE INVENTION

A) Field of the Invention

Among other things, the present invention is related to mounting systems for vertical conveyor belts. It has been unexpectedly determined that the present mounting systems are useful for diverters. The current mounting systems for vertical conveyor belts are particularly adapted for use with diverters positioned above horizontal conveyors carrying one or more articles. The combination of an upper coupling member positioned on the inward side of the vertical conveyor belt and a lower coupling member positioned outward of the outer surface of the conveyor frame secures the track of the vertical conveyor belt as it traverses about the conveyor frame.

B) Description of the Previous Art

1) U.S. Pat. No. 5,161,665—Cragun enables a lane merger apparatus. Column 5, lines 32-65, of the '665 patent reads, "Referring to FIGS. 5 and 7, each side transfer conveyor 18 further has a support or backing structure 76 which enables the rotating belts 31 to engage and maintain engagement of the articles 21 in the central conveyance path. The support structure 76 is disposed directly behind the portion of the belts 31 which are adjacent the central conveyance path. The support structure 76 comprises a vertical brace 85 which is coupled to a vertical bracket 79 via a bolt 97. Top and bottom horizontal roller supports 81 are connected to the brace 85 via screws. Center guides 95 are connected at the midsection of the brace 85, also via the bolt 97, and extend therefrom in opposing directions. A plurality of spacially parallel roller shafts 91 are vertically disposed between each roller support 81 and the center guide 95. As shown, rollers 77 are axially and rotatably linked to the roller shafts 91 and are separated by spacers 96, which are also axially disposed about the roller shaft 91. Preferably, the rollers 77 and spacers 96 are arranged on each shaft 91 so that they are staggered with respect to adjacent shafts 91, thereby providing a substantially flat outward surface with uniformly and densely positioned rollers 77. The rollers 77 provide backing support to the flexible belts 31 so that gripping contact between the belts 31 and articles within the conveyance path is uniformly and firmly maintained. Additionally, due to the rotation of the rollers 77 about the shafts 91, friction between the moving belts 31 and the backing support is reduced. The center guide 95 is further shown to have a generally V-shaped notch at its outwardly extended end. The belts 31 preferably have a backing rib 90 which is aligned with the center guide 95 and which cooperate to maintain alignment of the belt 31 during the transfer process." Among other things, Cragun is silent regarding utilization of reciprocating upper and lower coupling members to secure the vertical conveyor belt as it transverses about the conveyor belt's frame.

2) U.S. Pat. No. 3,366,220—Hebel enables a method and apparatus for single filing. Column 4, lines 64-67, of the '220 patent reads, "The terminal portion of the conveyor assumes a linear pattern again and the separated rows of jars are then diverted onto single file conveyor 15 by a pair of diverting belts 10a and 10b." Among other things, Hebel teaches a pair of vertical conveyor belts. However, the '220 patent is silent regarding the manner in which the vertical conveyor belts are attached to the conveyor frame.

3) U.S. Pat. No. 6,189,702—Bonnet enables an overhead mounted sorter for conveyors. FIG. 1 of Bonnet discloses a vertical belt assembly, and Column 7, lines 35-49, of the '702 patent reads, "To connect the carriage 40 to the serrated timing belt 46, a clamping connector 49 is provided on the top of the carriage. As best shown in FIGS. 5a, 5b and 5c, the connector is constructed of two plates spaced apart to form a void that receives the timing belt 46. The first plate is a serrated back plate 50 configured to mate with the serrated side of the timing belt 46. The second plate is a smooth faced plate 53. To fasten the connector 49 to the timing belt 46, the two ends of the belt 46a and 46b are inserted between the two plates so that the smooth side of the belt ends faces the smooth plate 53 and the serrated side faces and engages the serrated plate 50. This arrangement is best illustrated in FIG. 5c. Inserting the belt ends 46a-b so that the teeth of the timing belt interlock with the grooves of the plate 50 fully connect the belt and carriage." Among other things, Bonnet is silent regarding utilization of reciprocating upper and lower coupling members to secure the vertical conveyor belt as it traverses about the conveyor belt's frame.

4) U.S. Pat. No. 4,803,804—Bryant enables a telescopic belt tightener for horizontal conveyor belts. Column 2, lines 57 through Column 3, line 13, read, "A conventional conveyor is depicted at reference numeral 5. The conveyor includes a sturdy bed 7 for rotatably mounting rollers, such as an end roller 9, that support the belt 3. In accordance with the present invention, a telescopic belt tensioner 1 is fixedly mounted to each side of the conveyor bed 7 for adjusting the tension in the belt 3. The belt tensioners on the two sides of the bed are identical in construction and operation, so the description of one of them is sufficient. The belt tensioner comprises a quick release mechanism 10 having a housing 11 that preferably is fabricated as a square tube. To one side 13 of the housing 11 may be welded a pair of studs 15 that pass through aligned holes in the conveyor bed. The housing is firmly secured to the conveyor bed by nuts and washers 17. Near one end of the housing 11 are fastened a pair of L-shaped brackets 19 with their respective upstanding legs 21 in facing contact. Straddling the bracket legs 21 is a lever 23 that is pivotally mounted at one end thereof to the brackets 19 by a pin 25. Also pivotally mounted to the lever 23 is a second pin 27, received in which is a link 28. In the illustrated construction, the link 28 is in the form of a U-bolt having legs retained in the pin 27 by nuts 30." Among other things, Bryant is silent regarding utilization of reciprocating upper and lower coupling members to secure the vertical conveyor belt as it traverses about the conveyor belt's frame.

5) U.S. Pat. No. 6,273,243—Loose, et al. enables a device for correcting the course of a belt. Column 3, lines 22-37, reads, "Therefore, the dextrorotary moment is generated according to FIG. 4 via a reference roller RR. The reference roller RR is disposed on a lever arm pivotable in the rotary axis DA2, with the lever arm also being connected with the spring element FE. When the belt elasticity decreases, this changes the force F1' acting on the adjusting roller SR as well as the force that is exerted on the reference roller RR. If the spring element FE as well as the lever ratios are configured correctly, both torques change at the same ratio and the equilibrium of moments remains intact, that is, the adjusting roller SR does not tilt. If the belt runs off in the upward or downward direction, only the changed effective lever arm on the adjusting roller SR s1.+.x has an effect on the equilibrium of moments and the operation remains intact, even if the belt tension is changed." Among other things, Loose is silent regarding utilization of reciprocating upper and lower coupling members to secure the vertical conveyor belt as it traverses about the conveyor belt's frame.

6) U.S. Pat. No. 5,389,045—Lyons enables a conveyor belt tensioning mechanism. Column 2, line 45 through Column 3, line 2, read, "First adjustment means 13(a) includes a threaded shaft 52 having a first end fastened to a front member 54 of first bearing housing 30 by means of nuts 56. Second end of shaft 52 extends longitudinally outwardly beyond and end flange 58 on first side rail 20. Likewise, second adjustment means 13 includes a threaded shaft 60 having a first end fastened to second bearing housing 40 by means of nuts 62, one of which is welded to bearing housing 40. A second end of shaft 60 extends longitudinally outwardly beyond an end flange 64 on second side rail 22. As shown in FIG. 4, first indicating means 15(a) has an elastically expandable and contractible body portion 70 telescoped on shaft 52 for elastic expansion and contraction movement therealong, with a first end 72 of body portion 70 contacting flange 58. Likewise, the contractible body could be rotated 180 degrees so that the opposite end 76 of body portion 70 could contact flange 58. An end nut 74 is adjustably threaded onto second end of shaft 52. Nut 74 contacts a second end 76 of body portion 70 to lock indicating means 15(a) onto side rail 20. It would be equivalent to reverse indicating means 15(a) 180 degrees, so that first end 72 contacts nut 74 and second end 76 contacts flange 58. Body portion 70 telescopically contracts indicating means 15(a) as end nut 74 is threaded onto shaft 52." Among other things, Lyons is silent regarding utilization of reciprocating upper and lower coupling members to secure the vertical conveyor belt as it traverses about the conveyor belt's frame.

7) U.S. Pat. No. 7,222,728—Wier, et al. enables an adjustable shield for a conveyor belt. Wier's FIG. 2 shows a torsion adjuster 48 that contacts a slidable housing 60 having rotatable bearing 66 for gripping the pulley's drive shaft. Among other things, Wier is silent regarding utilization of reciprocating upper and lower coupling members to secure the vertical conveyor belt as it traverses about the conveyor belt's frame.

SUMMARY OF THE INVENTION

Unlike traditional mounting systems for vertical conveyor belts, the present invention utilizes the combination of a guide associated with the conveyor frame and a rider associated with the vertical conveyor belt to securely mount the vertical conveyor assemblage.

Previous mounting systems for vertical conveyor belts utilize a generally V-shaped rib attached to the frame facing side of the vertical conveyor belt. Due to the beveled outer dimensions of the V-shaped backing rib, unless high tension is applied to vertical conveyor belt, the V-shaped rib can wobble about its corresponding groove of the vertical conveyor frame. High tension applied to the vertical conveyor belt requires increased power to drive the belt and increases frictional heating of the belt. Applicants' current invention does not utilize the V-shaped rib backing for their vertical conveyor belts, thereby eliminating the problems associated with the prior generally V-shaped ribs.

Previous vertical belt diverters are mounted above the horizontal conveyor in such a manner as to provide adequate work space between the lower edge of the diverter and the horizontal conveyor so that the lower bearings of the diverter can be manually accessed and adjusted to increase the tension applied to the vertical conveyor belt. In other words, tools must access the diverter's lower bearings before tension applied to the vertical conveyor belt can be increase.

Applicants' novel and nonobvious tensioning system for increasing tension applied to the vertical belt eliminates the necessity of utilizing tools to adjust the tension applied by the lower bearings to the vertical conveyor belt diverter. Not only does Applicants' tensioning system for a vertical conveyor belt decrease the time to alter tension applied by the lower bearings to the vertical conveyor belt, the tensioning system also allows the lower edge of the diverter to be located very close to the upper surface of the horizontal conveyor. Placement of Applicants' vertical conveyor belt diverter in such close proximity to the upper surface of the horizontal conveyor allows Applicants' diverter to divert packages or articles of lesser height than sanctioned by previous vertical belt diverters.

The present invention eliminates various problems attributable to the previous mounting systems while meeting the long felt but unfulfilled need of providing a simple reciprocating coupling device for securing the track of the vertical conveyor belt as the vertical conveyor belt traverses about the vertical conveyor or diverter assembly. Applicants' current invention also meets the long felt but unfulfilled need of mounting a vertical belt diverter assembly in close proximity to the horizontal conveyor while eliminating the necessity of manually adjusting the lower bearings of the diverter assembly to increase the tension supplied to the vertical conveyor belt.

When practicing the present invention, an upper coupling member or rider attached to the inner side of the vertical conveyor belt reciprocates with a lower coupling member or guide mounted to the outward side of the conveyor frame. Preferred embodiments of the rider can include a depending catch that rides in the guide's slot such that vertical conveyor belt traverses about the conveyor's frame along a preselected track. Additionally, select embodiments of the present diverter assembly practice the use of a novel and a nonobvious belt tensioning apparatus.

An aspect of the present invention is to provide a mounting system for a vertical conveyor belt that is easy to utilize and install.

Still another aspect of the present invention is to provide embodiments that incorporate a low friction rider attached to a vertical conveyor belt.

It is another aspect of the present invention to enable methods incorporating the current diverter assemblage utilizing the mounting system for a vertical conveyor belt to diverter articles from a first path to a second path.

Still another aspect of the present invention is to provide a mounting system for a vertical conveyor belt that is of simpler construction than previous designs.

It is still another aspect of the present invention to provide embodiments that incorporate an upper coupling member for reciprocating with a lower coupling member.

Yet still another aspect of the present invention is to provide a diverter capable of generating sufficient RPM to proficiently divert one or more articles for a first path to a second path.

Yet another aspect of the present invention is to provide a mounting system for a vertical conveyor belt that allows for more time efficient replacement of vertical conveyor belts than previous mounting systems.

It is still another aspect of the present invention to provide embodiments that utilize a guide having a slot therein that reciprocates with a rider attached to the vertical conveyor belt.

Yet still another aspect of the present invention is to provide embodiments that utilize a rider having a depending catch that reciprocates with the vertical conveyor belt guide.

An embodiment of the present invention can be described as a mount for an endless vertical conveyor belt having an inward side and an outward article engaging surface, comprising: a) a frame supporting the endless vertical conveyor belt; the frame further comprising: i) a first outward surface proximate conveyed articles; and ii) a second outward surface opposed to the first outward surface and distal from the conveyed articles; b) a first lower coupling member mounted to the first outward surface of the frame; c) a second lower coupling member mounted to the second outward surface of the frame; and d) a continuous upper coupling member for reciprocating with the first and second lower coupling members.

Another embodiment of the present apparatus can be described as a system for diverting conveyed articles, comprising: a) a generally horizontal conveyor transporting said conveyed articles along a generally horizontal path; b) a vertical conveyor assemblage positioned above the generally horizontal conveyor and angled to divert one or more of the conveyed articles; the vertical conveyor assemblage further comprising: i) a vertical conveyor belt; ii) at least one drive pulley; iii) a follower roll; iv) a frame disposed between the one drive pulley and the follower roll; v) a first lower coupling member mounted to the frame; vi) a second lower coupling member mounted to the frame; and vii) a continuous upper reciprocating coupling member for reciprocating with the first and second lower coupling members; the upper reciprocating coupling member mounted to the inward side of said vertical conveyor belt.

Yet another embodiment of the present invention and method can be described as a method of a method of diverting one or more articles away from a carriage path of a generally horizontal conveyor carrying the articles, comprising the steps of: a) positioning a diverting assemblage above the carriage path, wherein said diverting assemblage comprises: i) a drive pulley mounted at a first end of the diverting assemblage; and ii) a follower roll mounted at a second end of the diverting assemblage; b) connecting a first guide to a first outward face of the diverting assemblage such that a first slot is created between the first guide and the first outward face; c) connecting a second guide to the second outward face of the diverting assemblage such that a second slot is created between the second guide and the second outward face; d) positioning a rider on an inward side of a vertical conveyor belt such that an upper edge of the rider is juxtaposed an upper edge of the vertical conveyor belt; e) mounting the vertical conveyor belt about the diverting assemblage such that the rider reciprocates with the first and second slots; and f) powering the drive pulley.

In still another embodiment, the present invention can be described as a vertical diverter assemblage, comprising a) a frame comprising: i) a first lengthwise side; ii) a second lengthwise side opposite the first lengthwise side; iii) a first guide parallel to and outward from the first lengthwise side comprising: A) a foot connected with the first lengthwise side; and B) an upright wall extending upward from the foot; and iv) a second guide parallel to and outward from the second lengthwise side comprising: A) a foot connected with the second lengthwise side; and B) an upright wall extending upward from the foot; b) a drive pulley mounted to a first end of a frame; c) a follower roll mounted to a second end of the frame; and d) an endless vertical conveyor belt engaged by the drive pulley, the follower roll, the first guide and the second guide, wherein the endless vertical conveyor belt further comprises a rider.

Yet another embodiment of the present device can be described as a mount for a vertical conveyor belt, comprising: a) a first footer attached to an outward surface of a first side of a frame; b) a second footer attached to an outward surface of a second side of the frame; c) a first upright rail connected with and extending upward from the first footer; d) a second upright rail connected with and extending upward from the second footer; and e) a rider attached proximate an upper edge of and an inward side of the vertical conveyor belt for coacting with said rails.

It is the novel and unique interaction of these simple elements which creates the apparatus and methods, within the ambit of the present invention. Pursuant to Title 35 of the Unite States Code, descriptions of preferred embodiments follow. However, it is to be understood that the best modes and preferred embodiments descriptions do not limit the scope of the present invention.

DESCRIPTION OF THE PREFERRED EMBODIMENTS

Although the disclosure hereof is detailed to enable those skilled in the art to practice the invention, the embodiments published herein merely exemplify the present invention.

In the most general sense, the present invention is a diverter. More specifically, the current invention is an endless vertical conveyor belt mounted about a frame that can be used to divert one or more items from a first carriage path to a second carriage path. Within the scope of the present invention, a continuous upper coupling member or rider is attached to the inward side of the endless conveyor belt and reciprocates with the first and second coupling members mounted to the frame. The combination of the coupling members, a drive pulley and follower roll allow the endless vertical conveyor belt to traverse about the conveyor frame and divert one or more items from a first carriage path to a second carriage path. It has been unexpectedly discovered that certain embodiments of the present diverter can generate vertical belt speeds of about 180 meters per minute. As used herein, "vertical belt" or "vertical conveyor belt" or "endless vertical conveyor belt" shall mean that the belt's article contacting surface is generally perpendicular to the horizontal.

Select embodiments of the present invention mount the diverter above a generally horizontal conveyor that carries one or more articles along a first carriage path. Generally, the diverter is mounted at a preselected angle oblique to the first carriage pathway. When an item contacts the moving endless vertical endless belt, the diverter diverts the item from the first carriage path to the second path.

Figure 1:
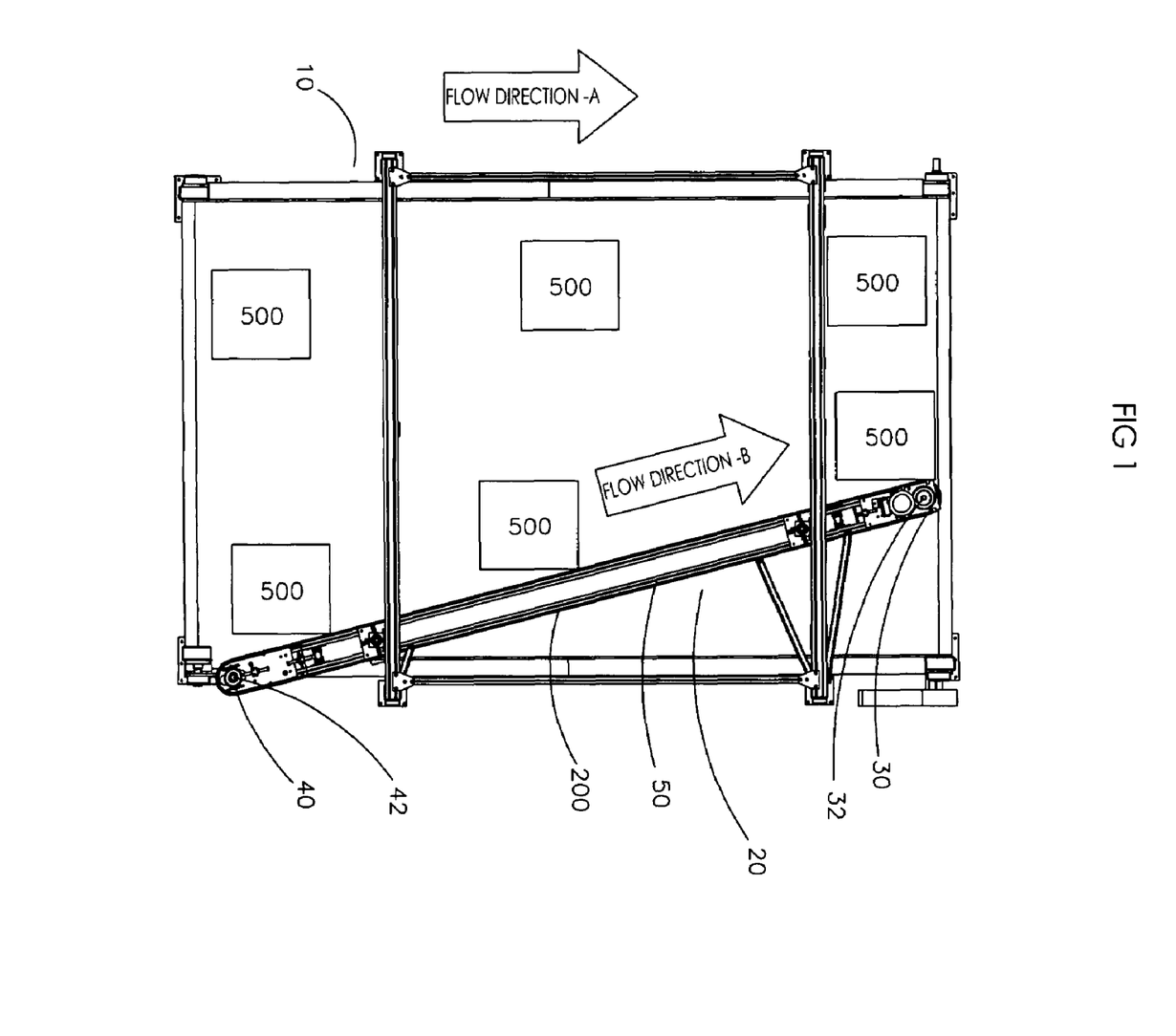
FIG. 1 is a plan view of horizontal conveyor (10) that has diverter (20) mounted above horizontal conveyor (10).

FIG. 1 is a plan view of horizontal conveyor (10) that has diverter (20) mounted above horizontal conveyor (10). Diverter (20) can be mounted above horizontal conveyor (10) in any manner acceptable in the art. In the embodiment portrayed, horizontal conveyor (10) transports a plurality of articles (500) and moves in the direction of arrow A.

As shown in the FIG. 1 embodiment, diverter (20) has drive pulley (30), follower roll (40), frame (50) and endless vertical conveyor belt (200). Endless vertical conveyor belt (200) moves in the direction of arrow B or clockwise as viewed from above diverter (20). However, those skilled in the art recognize that diverter (20) can be configured and positioned such that endless vertical conveyor belt (200) moves counter-clockwise as viewed from above diverter (20). Additionally, although not shown in FIG. 1, select embodiments of the present invention can position a plurality of diverters (20) about a generally horizontal conveyor to divert one or more articles. By way of illustration, embodiments of the present invention can be utilized: to merge a plurality of articles from a wider to a narrower conveyance stream on the same conveyor; to move articles from a first conveyor to a second conveyor; or to move articles from a first conveyor to devices other than conveyors.

Drive shaft (32) extends outward from pulley (30) and is connected with a power source (not shown) for powering drive shaft (32). Drive pulley (32) engages vertical conveyor belt (200) and moves the vertical conveyor belt about frame (50) of diverter (20). As vertical conveyor belt (200) moves, belt tension causes follower roll (40) to rotate about axle (42). When engineering parameters require, a second drive pulley can be utilized instead of follower pulley (40).

Figure 2:
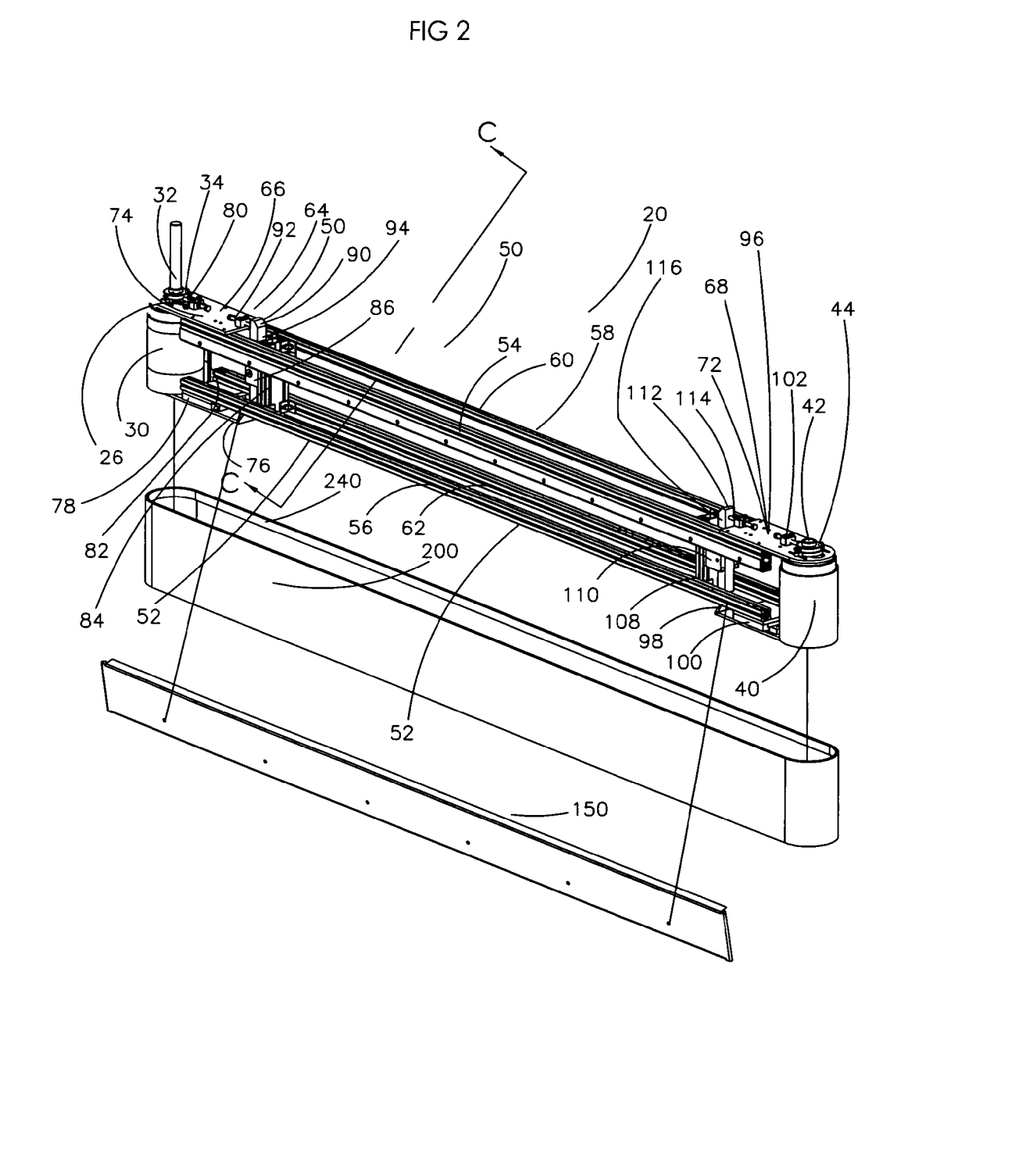
FIG. 2 is an exploded perspective of diverter (10).

FIG. 2 is a perspective of diverter (20) showing vertical conveyor belt (200) and deck (150) exploded away from frame (50) of diverter (20). Vertical conveyor belt (200) includes rider (240) (best seen in FIGS. 3 and 4). In the practice of select embodiments of the present invention, deck (150) engages part of vertical conveyor belt (200) as vertical conveyor belt (200) rotates about frame (50).

With a view still toward FIG. 2, article facing side (52) of frame (50) is provided with belt support (54) and horizontal member (56). Side (58) of frame (50) is distal from articles to be diverted and is provided with belt support (60) and horizontal member (62). First end (64) of frame (50) includes pulley mount (66) and second end (68) of frame (50) includes roll mount (72).

Upper support plate (74) of pulley mount (66) spans from belt support (54) to belt support (60). Upper support plate (74) is secured to belt supports (54 and 60) in any manner acceptable in the art. Lower movable plate (76) of pulley mount (66) spans between horizontal member (56) and horizontal member (62). In this embodiment, lower movable plate (76) slides within bearing (78) that is secured to horizontal members (56 and 62). Bearing (78) is secured to horizontal members (56 and 62) in any manner acceptable in the art.

Drive shaft (32) extends outward from upper rotable bearing (34) of pulley (30). Torsion adjuster (80) is mounted to upper support plate (74) and rides against the outer housing of rotable bearing (34). Lower movable plate (76) of pulley mount (66) carries a rotable bearing (not shown in this view). Stabilizing bar (82) extends between upper support plate (74) and lower movable plate (76) and is connected to upper support plate (74) and lower movable plate (76) in any manner acceptable in the art.

Framework (84) is connected to belt supports (54 and 60) and horizontal members (56 and 62). Lever mount (86) is affixed to framework (84) by any manner acceptable in the art. Lever (90) is attached to lever mount (86) such that lever can pivot toward and away from drive pulley (30). Upper support plate (74) has torsion adjuster (92) that abuts against lever (90). The application of pressure against upper section (94) of lever (90) causes lower movable plate (76) to move the rotable bearing (not shown in this view) outward from frame (50), thereby increasing the tension applied to vertical conveyor belt (200).

With reference still toward FIG. 2, upper support plate (96) of roll mount (72) spans from belt support (54) to belt support (60). Upper support plate (96) is secured to belt supports (54 and 60) in any manner acceptable in the art. Lower movable plate (98) of roll mount (72) spans between horizontal member (56) and horizontal member (62). In this embodiment, lower movable plate (98) slides within bearing (100) that is secured to horizontal members (56 and 62). Bearing (100) is secured to horizontal members (56 and 62) in any manner acceptable in the art.

Torsion adjuster (102) is mounted to upper support plate (96) and rides against outer housing of rotable bearing (44). Lower movable plate (98) of roll mount (72) carries a rotable bearing (not shown in this view). Framework (108) is connected to belt supports (54 and 60) and horizontal members (56 and 62). Lever mount (110) is affixed to framework (108) by any manner acceptable in the art. Lever (112) is attached to lever mount (110) such that lever (112) can pivot toward and away from follower roll (40). Upper support plate (96) has torsion adjuster (114) that abuts against lever (112). The application of pressure against upper section (116) of lever (90) causes lower movable plate (98) to move the rotable bearing (not shown in this view) outward from frame (50), thereby increasing the tension applied to vertical conveyor belt (200).

For the embodiment shown in FIG. 2: framework (84) and framework (108) are like structures; lever mount (86) and lever mount (110) are like structures; lever (90) and lever (112) are like structures; upper support plate (74) and upper support plate (96) are like structures; lower movable plate (76) and lower movable plate (98) are like structures; bearing (78) and bearing (100) are like structures; and torsion adjusters (80), (92), (102) and (114) are like structures.

Figure 3:
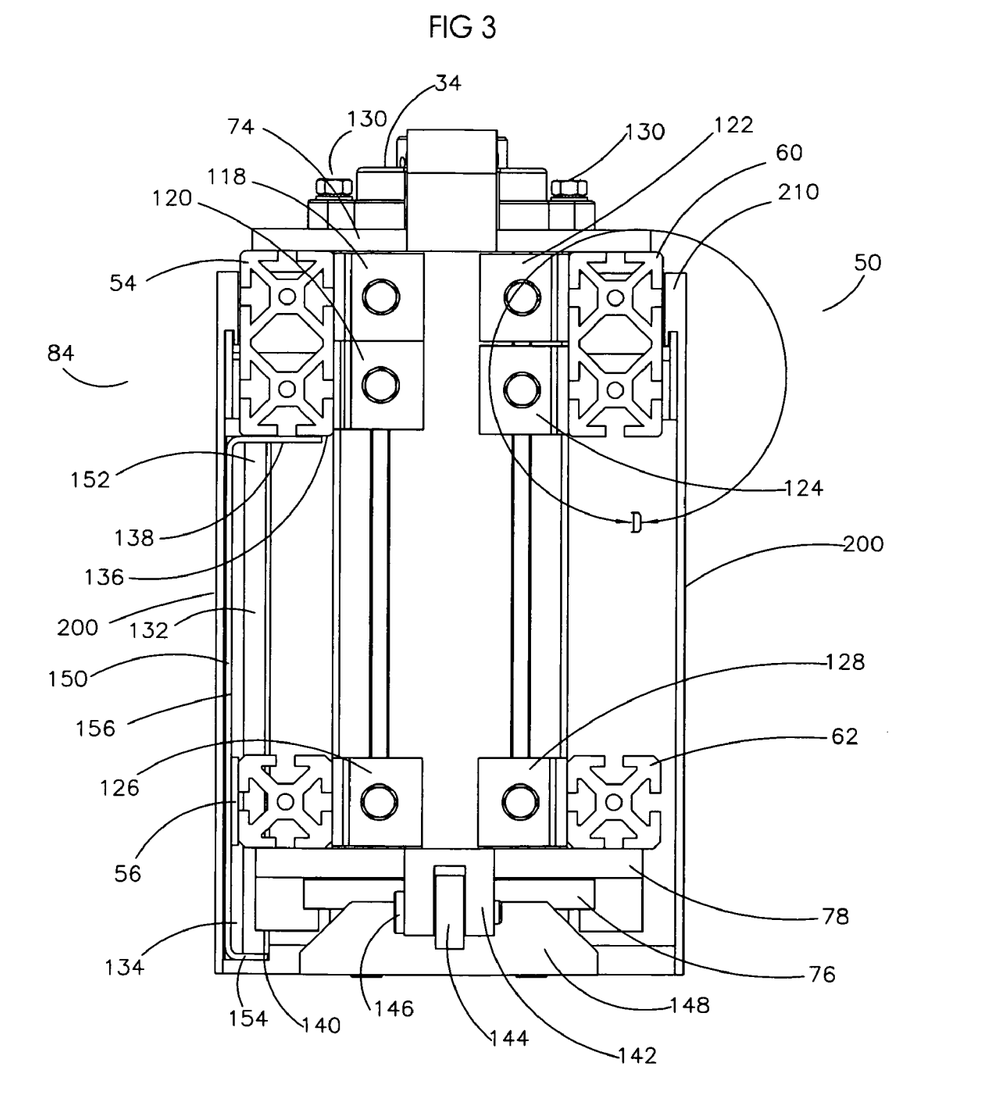
FIG. 3 is a cross section of frame (50) as taken through framework (84) along plane C-C as viewed when looking toward drive pulley (30).

FIG. 3 is a cross section of frame (50) as taken through framework (84) along plane C-C as viewed when looking toward drive pulley (30). Framework (84) includes upper mounting blocks (118, 120, 122, 124), lower mounting blocks (126, 128) and vertical members (130, 132). Upper mounting blocks (118 and 120) are attached to belt support (54) that is positioned outward of framework (84). Upper mounting blocks (122 and 124) are attached to belt support (60) that is positioned outward of framework (84). Lower mounting block (126) is attached to horizontal member (56) and lower mounting block (128) attached to horizontal member (62). Horizontal members (56 and 62) are positioned outward of framework (84).

Upper support plate (74) spans between belt supports (54 and 60). Rotable bearing (34) is supported by upper support plate (74). A pair of locking bolts (130) are provided to lock rotable bearing (34) in position.

With a view still toward FIG. 3, expander (132) is situated between upper belt support (54) and lower horizontal member (56). Extension member (134) depends downwardly from lower horizontal member (56). Deck (150) includes upper bend (152), lower bend (154) and outward face (156). Upper bend (152) of deck (150) abuts lower edge (136) of upper belt support (54) and upper edge of (138) of expander (132). Lower bend (154) of deck (150) is secured about lower edge (140) of extension member (134). A portion of vertical conveyor belt (200) runs against outward face (156) of deck (150).

Bearing (78) is positioned beneath horizontal members (56 and 62). Lower movable plate (76) can slide along bearing (78). Lower end of lever (90) includes bearing holder (142)

for roller bearing (144) and axle bolt (146). Vertical conveyor belt tension is increased when roller bearing (144) contacts abutment projection (148) of lower movable plate.

Figure 4:
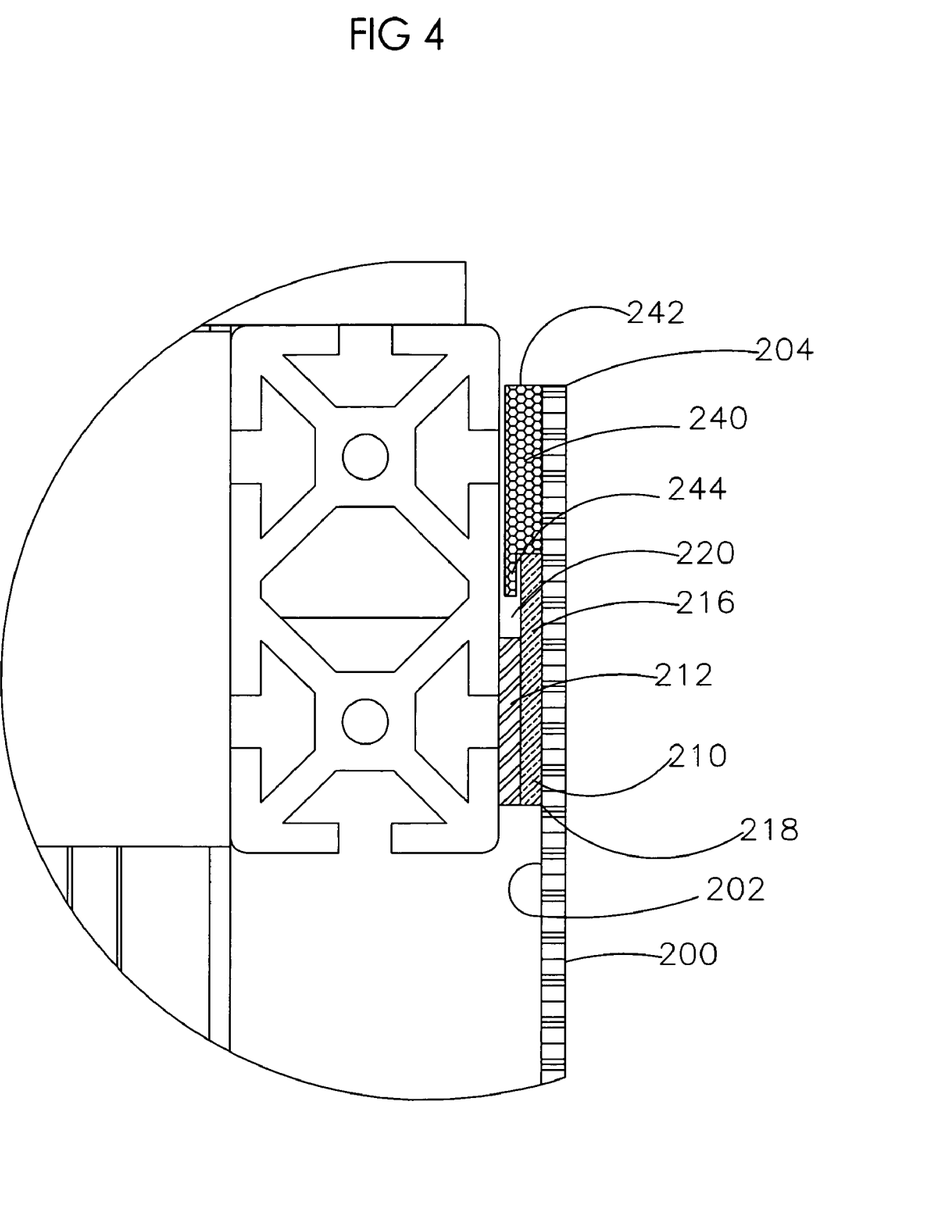
FIG. 4 is a close-up of section D of FIG. 3.

FIG. 4 is a close-up of section D of FIG. 3. Spacer (212) is affixed to belt support (60). Upright wall or rail (216) of guide (210) extends vertically upward from foot or footer (218). Foot (218) and upright wall (216) are secured to spacer (212) via adhesion or mechanical compression. In select embodiments, a series of flathead fasteners are used to secure foot (218) and spacer (212) to each or foot (218) or spacer (212) to the conveyor frame. The combination of spacer (212), foot (218) and upright wall or rail (216) create slot (220).

Rider (240) is secured to inward side (202) of vertical conveyor belt (200) via adhesion or by stitching. As shown in the FIG. 4 embodiment, upper body (242) of rider (240) is juxtaposed inward side (202) of vertical conveyor belt (200) and proximate upper edge (204) of vertical conveyor belt (200). Rider (240) is also provided with depending catch (244) that depends downwardly from upper body (242) to reciprocate with slot (220) of guide (210).

In select embodiments, upright wall (216) of guide (210) is composed of 304 stainless steel. The apex of upright wall (216) contacting upper body (242) is polished to lessen friction. In select preferred embodiments, rider (240) includes a low friction composition. Endless vertical conveyor belts of the present invention are composed of commercially available materials suitable of the manufacture of vertical conveyor belts. Rider (240) is attached to vertical conveyor belt (200) with a urethane adhesive and stitching and can include polished stainless steel and conveyor belt fabrics sturdy enough to receive stitches without tearing. In select preferred embodiments, rider (240) can include a low friction composition.

Figure 5:
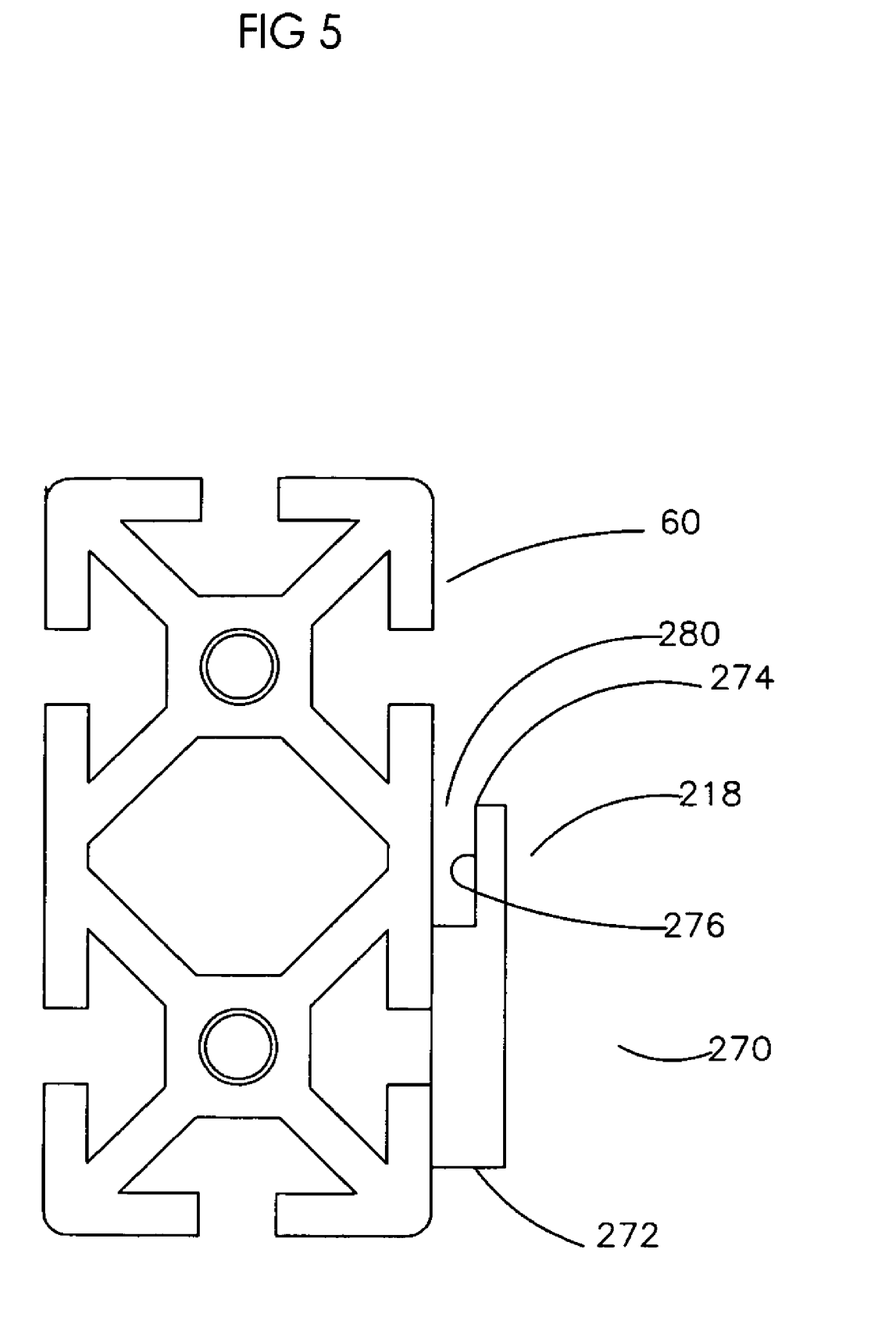
FIG. 5 is a close-up cross section of another embodiment of the guide member of the present invention.

FIG. 5 is a close-up cross section of another embodiment of the guide member of the present invention. Integrally formed guide member (270) includes foot (272) and rail (274). Slot (280) is created between inward side (276) of rail and outward side of belt support (60). Integrally formed guide member (270) is attached to outward side of belt support (60) by a series of flathead fasteners (not shown in this view).

Figure 6:
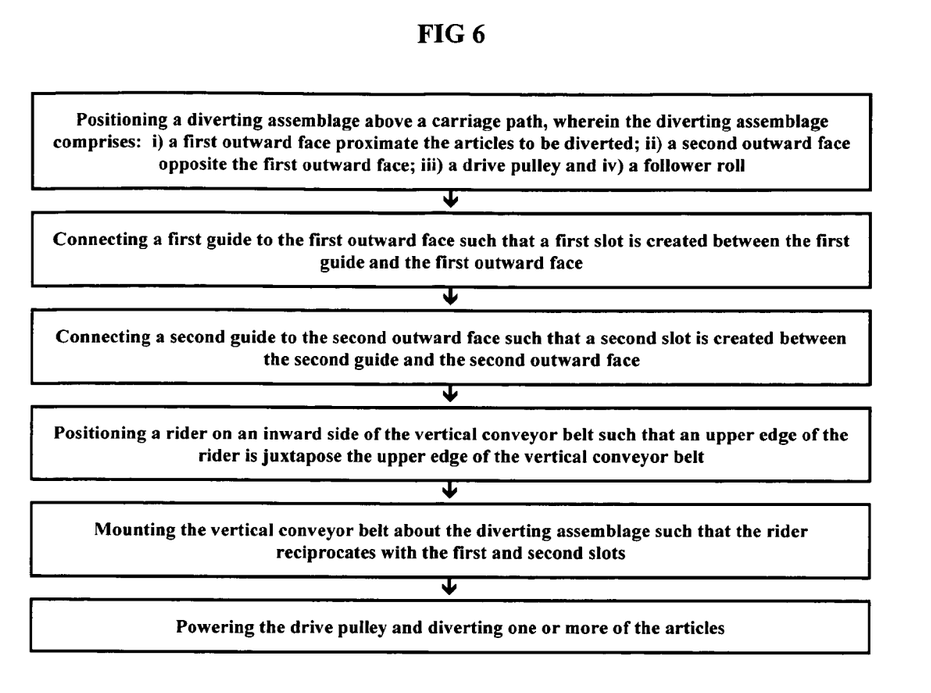
FIG. 6 is an exemplification of the steps of an embodiment of the current method.
Figure 7:
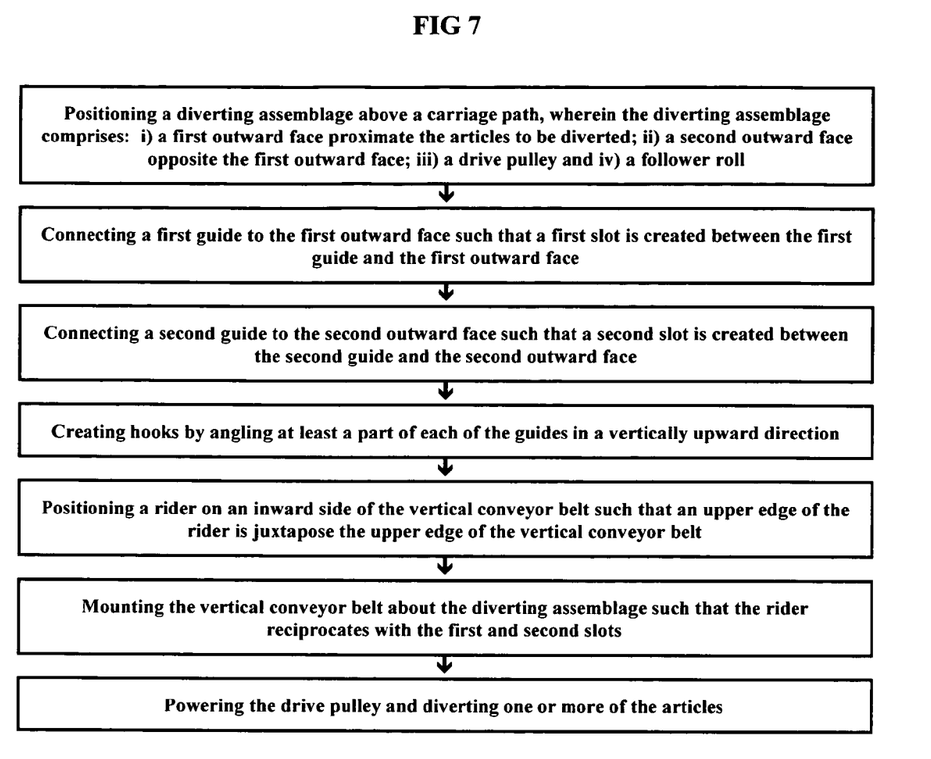
FIG. 7 is a diagrammatic representation of the steps of an embodiment of the present invention.
Figure 8:
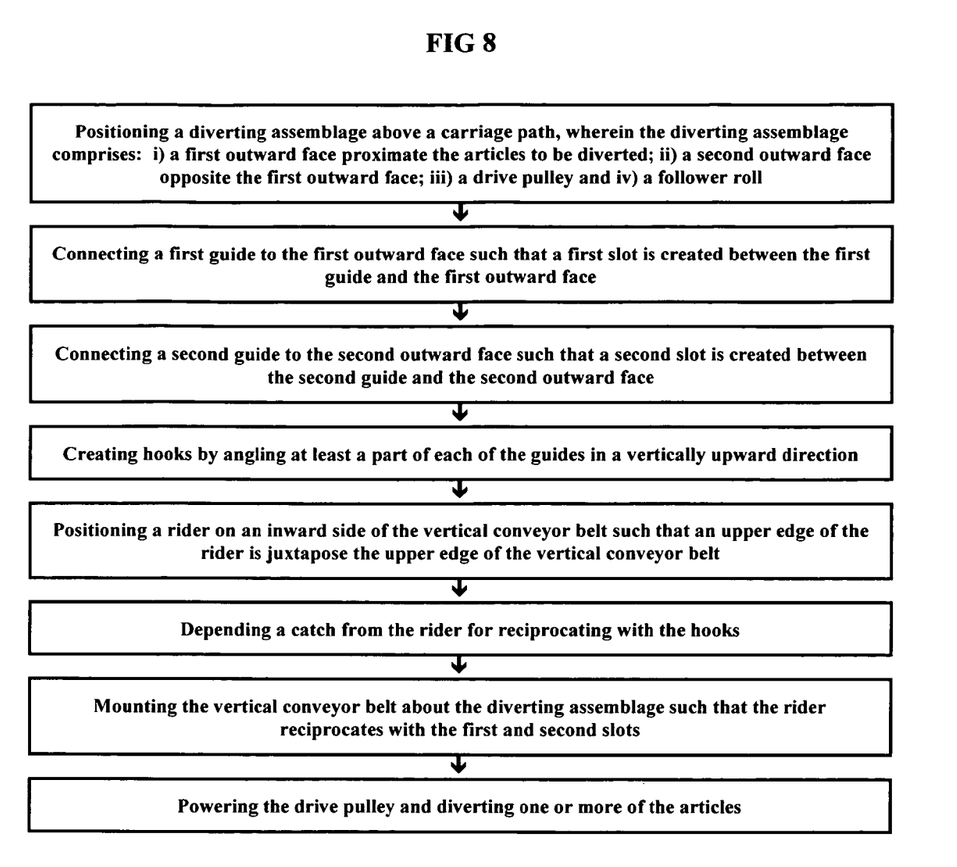
FIG. 8 is another diagrammatic representation of the steps of an embodiment of the present invention.

Steps associated with the practice of the current invention and method are set forth in FIGS. 6-8. Those steps are related to the practice of making and using embodiments within the scope of the present invention.

Having disclosed the invention as required by Title 35 of the United States Code, Applicants now pray respectfully that Letters Patent be granted for their invention in accordance with the scope of the claims appended hereto.

What is claimed is:

1. A mount for an endless vertical conveyor belt having an inward side and an outward article engaging surface, comprising:
   a) a frame supporting said endless vertical conveyor belt; said frame further comprising:
      i) a first outward surface proximate conveyed articles; and
      ii) a second outward surface opposed to said first outward surface and distal from said conveyed articles;
   b) a first lower coupling member mounted to said first outward surface of said frame;
   c) a second lower coupling member mounted to said second outward surface of said frame; and
   d) a continuous upper coupling member for reciprocating with said first and second lower coupling members; said continuous upper coupling member mounted to said inward side of said endless vertical conveyor belt and having an upper edge proximate an upper widthwise edge of said vertical conveyor belt.

2. The invention of claim 1, wherein said continuous upper coupling member is composed of further comprises a low friction composition.

3. The invention of claim 2, wherein each of said lower coupling members comprise:
   a) a footer attached to said outward surfaces of said frame; and
   b) a rail attached to each said footer; said rail extending vertically upward from said footer, thereby creating a slot between said outward surface and an inner side of said rail.

4. The invention of claim 3, wherein said continuous upper coupling member further comprises a depending catch.

5. The invention of claim 4 further comprising a spacer positioned between said outer surface of said frame and said footer.

6. A system for diverting conveyed articles, comprising:
   a) a generally horizontal conveyor transporting said conveyed articles along a generally horizontal path;
   b) a vertical conveyor assemblage positioned above said generally horizontal conveyor and angled to divert one or more of said conveyed articles away from a first path to a second path; said vertical conveyor assemblage further comprising:
      i) a vertical conveyor belt;
      ii) at least one drive pulley;
      iii) a follower roll;
      iv) a frame disposed between said at least one drive pulley and said follower roll; said frame further comprising:
         A) a first outward surface proximate conveyed articles; and
         B) a second outward surface opposed to said first outward surface and distal from said conveyed articles;
      v) a first lower coupling member mounted to said first outward surface such that said first lower coupling member extends outward from said first outward surface and has a length approximate a length of said first lower coupling member;
      vi) a second lower coupling member mounted to said second outward surface such that said second lower coupling member extends outward from said second outward surface and has a length approximate a length of said second lower coupling member; and
      vii) a continuous upper reciprocating coupling member for reciprocating with said first and second lower coupling members; said upper reciprocating coupling member mounted to said inward side of said vertical conveyor belt and having an upper widthwise edge juxtaposed an upper widthwise edge of said vertical conveyor belt.

7. The invention of claim 6, wherein said lower coupling members comprise slots.

8. The invention of claim 7, wherein said continuous upper reciprocating coupling member comprises a depending catch.

9. A vertical diverter assemblage, comprising
   a) a frame comprising:
      i) a first lengthwise side;
      ii) a second lengthwise side opposite said first lengthwise side;
      iii) a first guide parallel to and outward from said first lengthwise side comprising:
         A) a foot connected with said first lengthwise side; and B) an upright wall extending upward from said foot such that a slot is created between an outward side of said first lengthwise side and an inward side of said upright wall; and iv) a second guide parallel to and outward from said second lengthwise side comprising:

A) a foot connected with said second lengthwise side; and

B) an upright wall extending upward from said foot such that a slot is created between an outward side of said second lengthwise side and an inward side of said upright wall;

b) a drive pulley mounted to a first end of a frame;

c) a follower roll mounted to a second end of said frame opposite said first end of said frame; and d) an endless vertical conveyor belt engaged by said drive pulley, said follower roll, said first guide and said second guide, wherein said endless vertical conveyor belt further comprises a rider connected to an inward side of said conveyor belt for reciprocating with said slots.

10. The invention of claim 9, wherein said rider comprises polished stainless steel and stitchable fabric.

11. The invention of claim 10, wherein said rider further comprises a catch.

12. A method of diverting one or more articles away from a carriage path of a generally horizontal conveyor carrying said one or more articles, comprising the steps of:

a) positioning a diverting assemblage above said carriage path, wherein said diverting assemblage comprises:

i) a first outward face proximate said one or more articles;

ii) a second outward face opposite said first outward face and distal from said one or more articles;

iii) a drive pulley mounted at a first end of said diverting assemblage; and iv) a follower roll mounted at a second end of said diverting assemblage;

b) connecting a first guide to said first outward face such that a first slot is created between said first guide and said first outward face;

c) connecting a second guide to said second outward face such that a second slot is created between said second guide and said second outward face;

d) positioning a rider on an inward side of a vertical conveyor belt such that an upper edge of said rider is juxtaposed an upper edge of said vertical conveyor belt;

e) mounting said vertical conveyor belt about said diverting assemblage such that said rider reciprocates with said first and second slots; and f) powering said drive pulley to divert said one or more articles.

13. The method of claim 12 further comprising the step of creating a hook by angling at least a part of each said guides in a vertically upward direction.

14. The method of claim 13 further comprising the step of depending a catch from said rider for reciprocating with said hooks.

15. A mount for a vertical conveyor belt, comprising:

a) a first footer attached to an outward surface of a first side of a frame;

b) a second footer attached to an outward surface of a second side of said frame;

c) a first upright rail connected with and extending upward from said first footer;

d) a second upright rail connected with and extending upward from said second footer; and e) a rider attached proximate an upper edge of and an inward side of said vertical conveyor belt for coacting with said rails.

16. The invention of claim 15, wherein said rider comprises material capable of receiving one or more stitches and polished stainless steel.

17. The invention of claim 16, wherein said rider further comprises a depending catch for riding inside said first and said second upright rails.

18. The invention of claim 17 further comprising a spacer.

* * * * *